(12) United States Patent
Wu

(10) Patent No.: US 6,173,630 B1
(45) Date of Patent: Jan. 16, 2001

(54) WORKING MACHINE FOR MACHINING A WORKPIECE

(76) Inventor: Hsuan Lung Wu, No. 4-6, Lane Leh-Tyan, Feng-Shu Li, Nan Tun District, Taichung (TW)

(*) Notice: Under 35 U.S.C. 154(b), the term of this patent shall be extended for 0 days.

(21) Appl. No.: 09/418,185

(22) Filed: Oct. 13, 1999

Related U.S. Application Data

(63) Continuation-in-part of application No. 09/031,461, filed on Feb. 26, 1998, now abandoned.

(51) Int. Cl.[7] .................................................. B23B 9/00
(52) U.S. Cl. ......................... 82/129; 82/137; 82/142; 82/154; 82/165
(58) Field of Search ........................... 82/129, 132, 137, 82/142, 147, 148, 149, 150, 154, 158, 164, 170, 903, 1.11, 90, 165

(56) References Cited

U.S. PATENT DOCUMENTS

| | | | |
|---|---|---|---|
| 5,152,201 | * 10/1992 | Izawa | .................. 82/129 X |
| 5,758,554 | * 6/1998 | Miyano | .................. 82/1.11 |
| 5,787,560 | * 8/1998 | Schalles | .................. 82/129 X |
| 5,815,902 | * 10/1998 | Osterried et al. | .................. 82/129 X |
| 5,904,082 | * 5/1999 | Link et al. | .................. 82/129 |

FOREIGN PATENT DOCUMENTS

| | | | |
|---|---|---|---|
| 0186501 | * 10/1983 | (JP) | .................. 82/129 |
| 403117501 | * 5/1991 | (JP) | .................. 82/129 |
| 406134603 | * 5/1994 | (JP) | .................. 82/129 |

* cited by examiner

Primary Examiner—Henry W. H. Tsai
(74) Attorney, Agent, or Firm—Charles E. Baxley

(57) ABSTRACT

A working machine for machining a workpiece includes a base having a first track and a second track mounted therein and arranged in parallel with each other, at least one clamping device slidably mounted in the first track for clamping the workpiece, and at least one cutter device slidably mounted in the second track to mate with the at least one clamping device for machining the workpiece. In such a manner, the at least one cutter device is movable relative to the at least one clamping, device to machine the two ends of the workpiece.

10 Claims, 5 Drawing Sheets

WORKING MACHINE FOR MACHINING A WORKPIECE

This Appln is a C-I-P of Ser. No. 09/031,461 filed Feb. 26, 1998, Abn.

BACKGROUND OF THE INVENTION

1. Field of the Invention

The present invention relates to a working machine, and more particularly to a computer numeric control (abbreviated as CNC hereinafter) working machine that can be used for machining both ends and the mediate portion of a workpiece.

2. Description of the Related Prior Art

A conventional CNC working machine comprises a chuck for securing one end of a workpiece, and a rotatable cutter blade for machining the other end of the workpiece. However, the conventional CNC working machine cannot be used for machining both ends of the workpiece simultaneously.

The closet prior arts of a working machine are disclosed in U.S. Pat. No. 5,758,554 to Miyano, entitled "MACHINE TOOL AND METHOD FOR MACHINING A LONG-SHAFTED WORKPIECE", and U.S. Pat. No. 5,842,393 to Nagel, entitled "MACHINE TOOL". In the Miyano prior art, it has to use a clamping device in conjunction with two sets of cutter devices so as to machine both ends of the workpiece. In the Nagel prior art, it has to use three sets of clamping devices in conjunction with two sets of cutter devices so that it is necessary to detach the workpiece from the clamping device to machine both ends of the workpiece.

SUMMARY OF THE INVENTION

The primary objective of the present invention is to provide a working machine for machining a workpiece comprising a base including a first track and a second track mounted therein and arranged in parallel with each other; at least one clamping device slidably mounted in the first track and including a chuck for clamping the workpiece therein; and at least one cutter device slidably mounted in the second track to mate with the at least one clamping device for machining the workpiece, wherein, the at least one cutter device is movable relative to the at least one clamping device to machine the two ends of the workpiece.

The at least one cutter device includes a seat slidably mounted in the second track, a slide slidably mounted on the seat to move therewith and slidable along a direction perpendicular to that of the second track, and a cutter element secured to the slide to move therewith so that the cutter element is slidable along the second track and is slidable along a direction perpendicular to that of the second track.

The working machine further comprises at least one positioning device slidably mounted in the first track and including a centering member detachably abutting one end of the workpiece for positioning the one end of the workpiece.

According to the embodiment of the present invention, the working machine comprises a first clamping device mating with a first cutter device, and a second clamping device mating with a second cutter device. The working machine also comprises a first positioning device mating with the first clamping device, and a second positioning device mating with the second clamping device.

The working machine further comprises a first motor mounted on the base for moving the at least one clamping device and for moving the at least one positioning device, a second motor mounted on the base for rotating the chuck of the at least one clamping device, and at least one servo motor mounted on the base and including a slidable threaded rod for moving the at least one cutter device.

Further objectives and advantages of the present invention will become apparent after a complete reading of the detailed description with reference to the accompanying drawings.

DETAILED DESCRIPTION OF THE PREFERRED EMBODIMENTS

Figure 1:
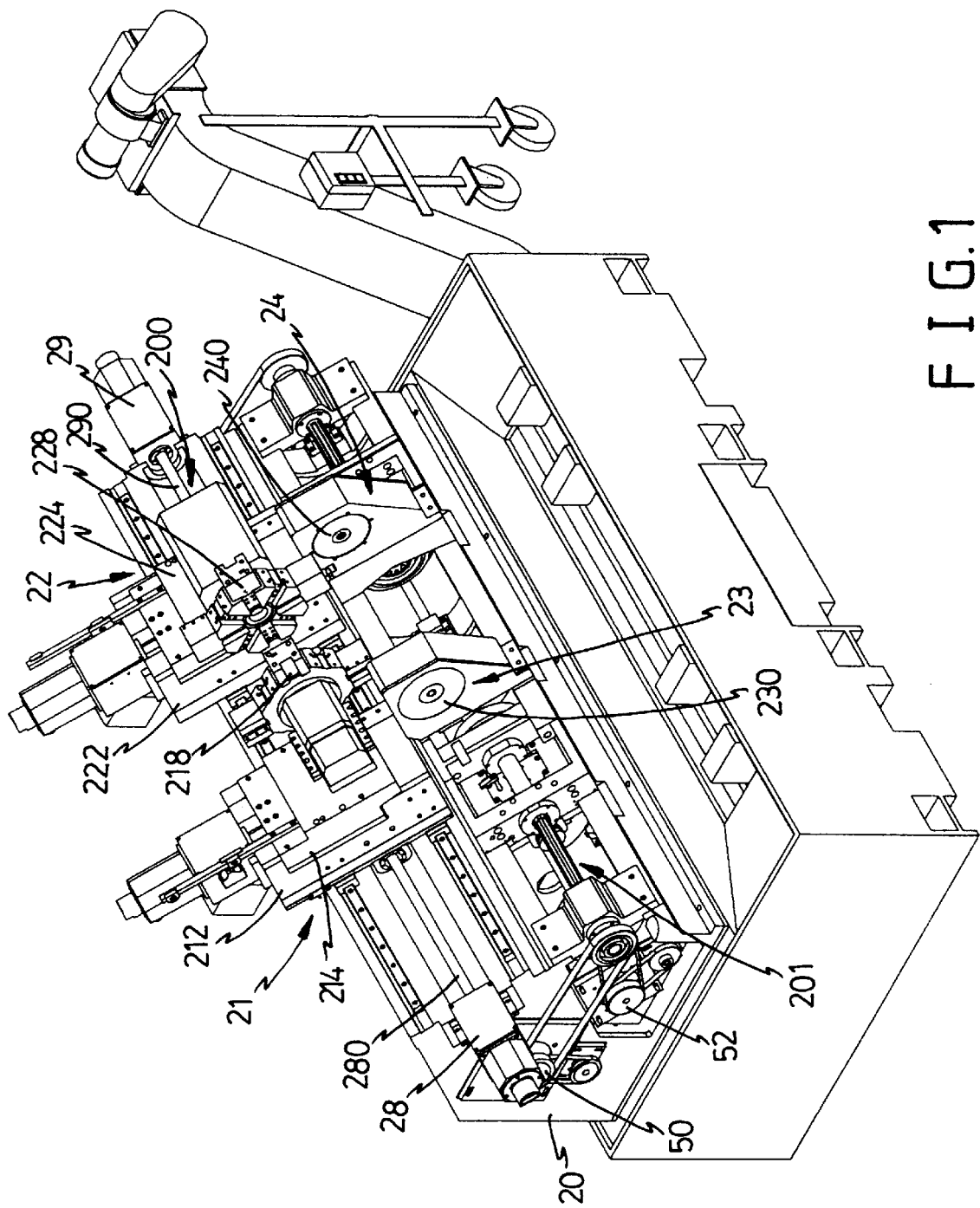
FIG. 1 is a perspective view of a CNC working machine according to the present invention.
Figure 2:
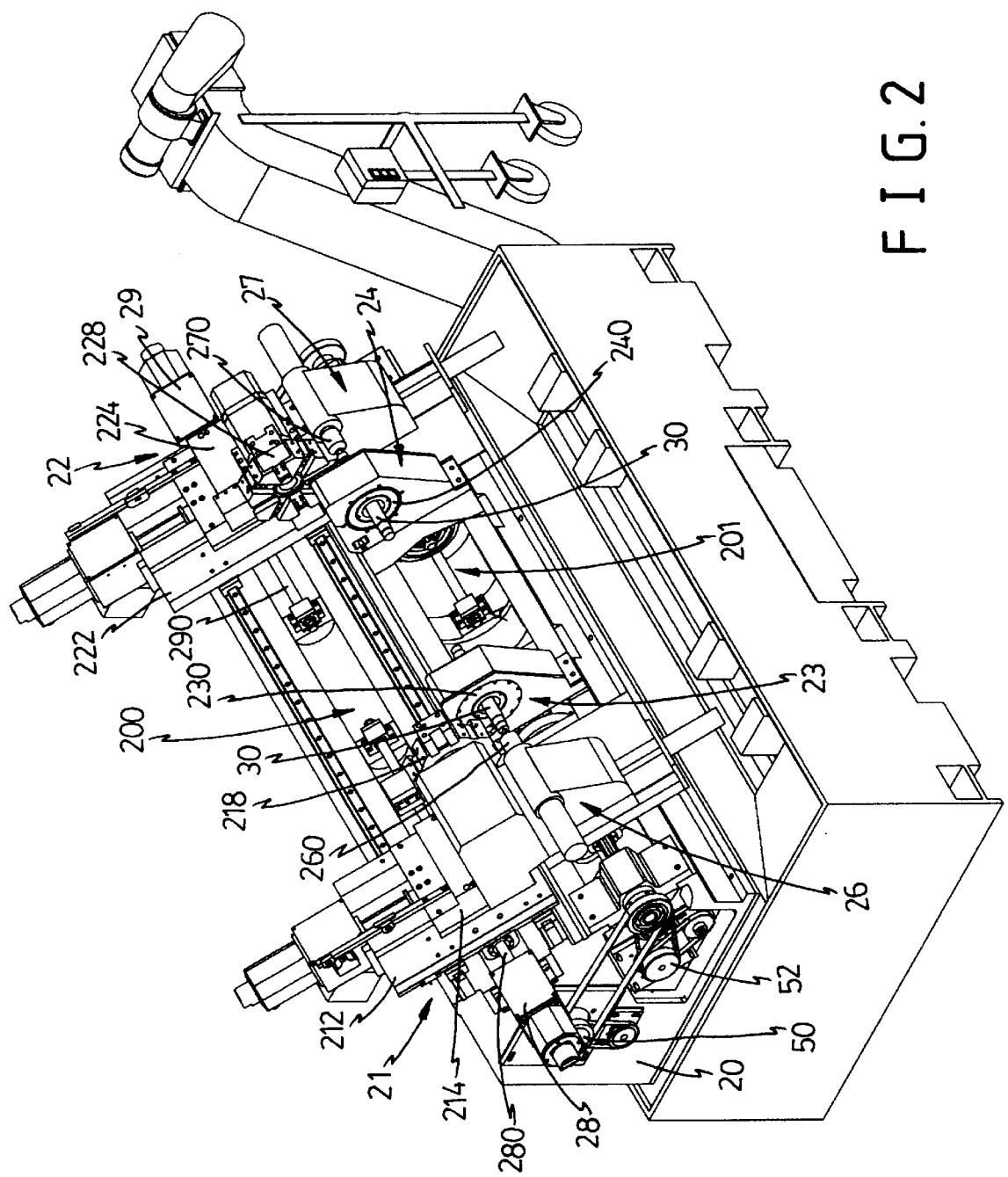
FIG. 2 is a perspective view of the CNC working machine according to the present invention.
Figure 3:
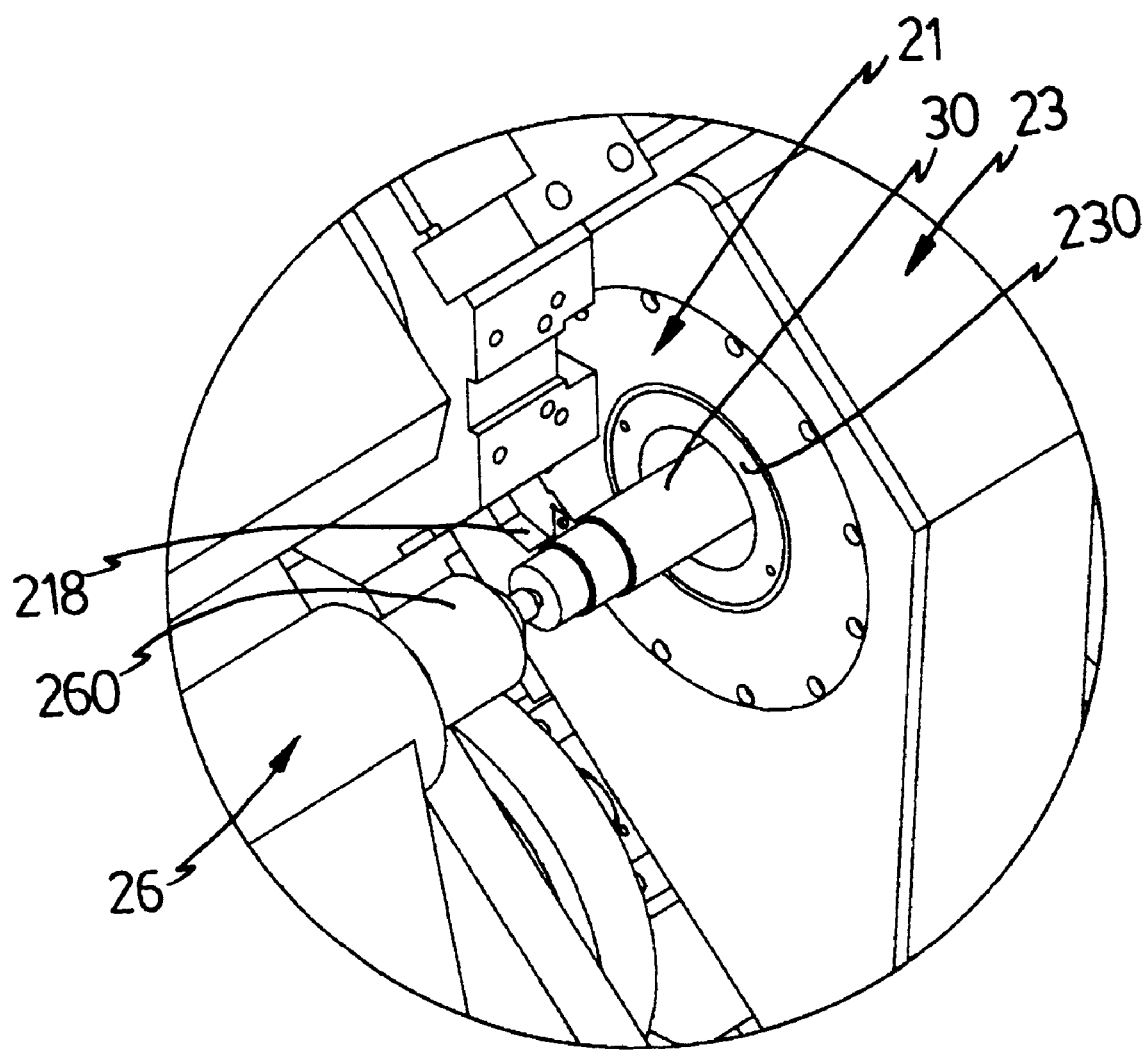
FIG. 3 is partially cut-away enlarged view of the working machine as shown in FIG. 2.

With reference to FIGS. 1–3, a CNC working machine according to the present invention is used for machining a workpiece 30 and comprises a base 20 including a first track 201 and a second track 200 mounted therein and arranged in parallel with each other, a first clamping device 23 and a second clamping device 24 each slidably mounted in the first track 201 for clamping the workpiece 30, and a first cutter device 21 and a second cutter device 22 each slidably mounted in the second track 200 to each mate with the first clamping device 23 and the second clamping device 24 respectively for machining the workpiece 30. By such an arrangement, each of the first cutter device 21 and the second cutter device 22 is movable relative to the respective first clamping device 23 and the second clamping device 24 to machine the two ends of the workpiece 30.

The first cutter device 21 includes a first seat 212 slidably mounted in the second track 200, a first slide 214 slidably mounted on the first seat 212 to move therewith and slidable along a direction perpendicular to that of the second track 200, and a first cutter element 218 secured to the first slide 214 to move therewith so that the first cutter element 218 is slidable along the second track 200 and is slidable along a direction perpendicular to that of the second track 200. The second cutter device 22 includes a second seat 222 slidably mounted in the second track 200, a second slide 224 slidably mounted on the second seat 222 to move therewith and slidable along a direction perpendicular to that of the second track 200, and a second cutter element 228 secured to the second slide 224 to move therewith so that the second cutter element 228 is slidable along the second track 200 and is slidable along a direction perpendicular to that of the second track 200.

The first clamping device 23 includes a first chuck 230 for clamping the workpiece 30 therein, and the second clamping device 24 includes a second chuck 240 for clamping the workpiece 30 therein The working machine further comprises a first positioning device 26 slidably mounted in the first track 201 to mate with the first clamping device 23 and including a first centering member 260 detachably abutting one end of the workpiece 30 for positioning the one end of the workpiece 30, and a second positioning device 27 slidably mounted in the first track 201 to mate with the second clamping device 24 and including a second centering member 270 detachably abutting one end of the workpiece 30 for positioning the one end of the workpiece 30.

The working machine further comprises a first motor 52 mounted on the base 20 for moving the first clamping device 23 and the mating first positioning device 26, and for moving the second clamping device 24 and the mating second positioning device 27, and a second motor 50 mounted on the base 20 for rotating the first chuck 230 of the first clamping device 23 and for rotating the second chuck 240 of the second clamping device 24. The working machine further comprises a first servo motor 28 mounted on the base 20 and including a first threaded rod 280 for moving the first cutter device 21, and a second servo motor 29 mounted on the base 20 and including a second threaded rod 290 for moving the second cutter device 22.

Figure 4:
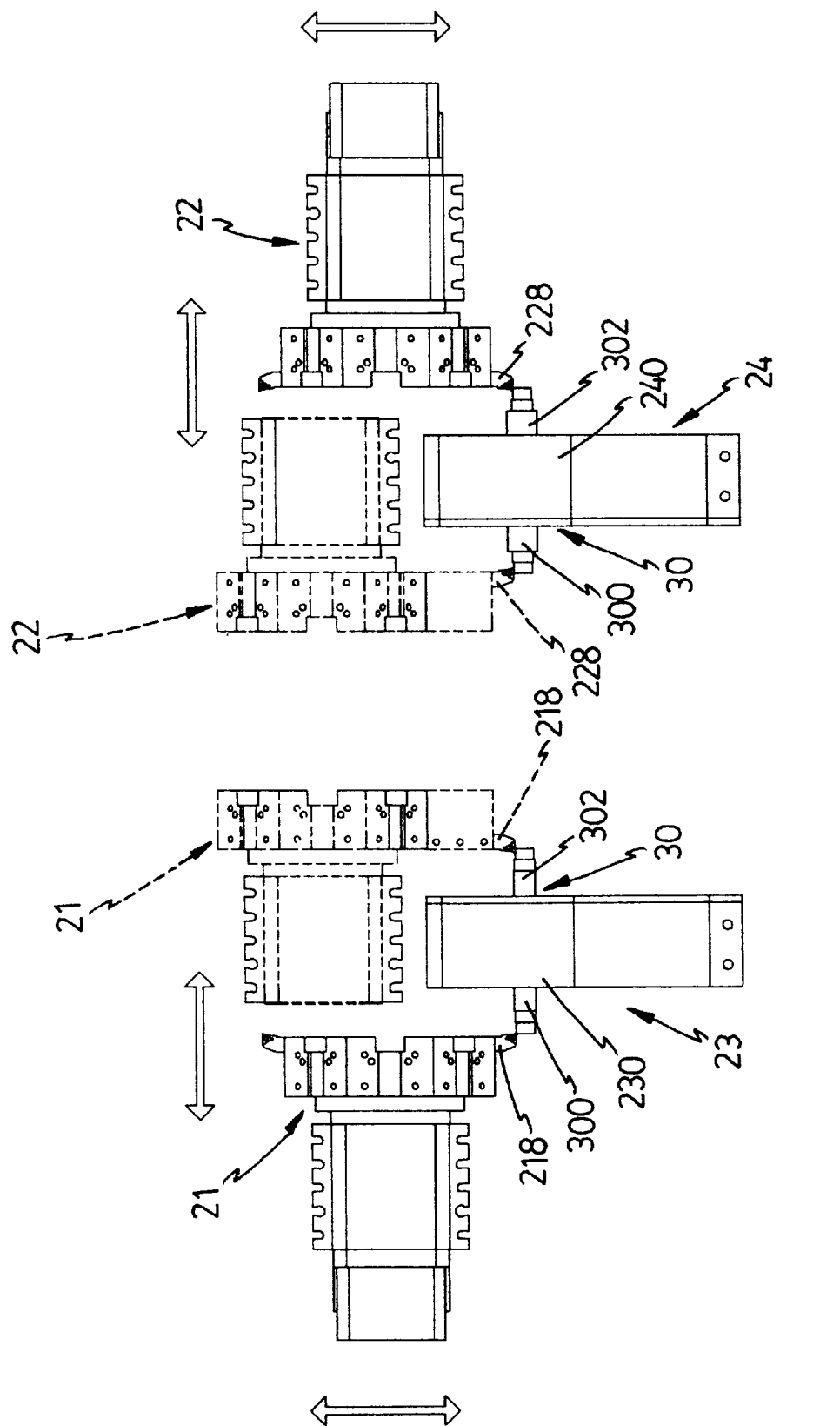
FIG. 4 is an operational view of the working machine as shown in FIG. 2.

In operation, referring to FIG. 4 with reference to FIGS. 1–3, the workpiece 30 is clamped in the first chuck 230 of the first clamping device 23, with its first end 300 and second end 302 protruding outward from the first clamping device 23. The first slide 214 of the first cutter device 21 is then moved downward on the first seat 212 along the direction perpendicular to that of the second track 200 to approach the workpiece 30 so that the first cutter element 218 can be used to machine the first end 300 of the workpiece 30. The first slide 214 of the first cutter device 21 is then moved upward on the first seat 212 along the direction perpendicular to that of the second track 200 to leave the workpiece 30, and the first cutter device 21 is then moved along the second track 200 to approach the second end 302 of the workpiece 30 so that the first cutter element 218 can be used to machine the second end 302 of the workpiece 30. In such a manner, the first cutter device 21 can be used to machine the two ends of the workpiece 30.

Similarly, the workpiece 30 may be clamped in the second chuck 240 of the second clamping device 24, with its first end 300 and second end 302 protruding outward from the second clamping device 24. The second slide 224 of the second cutter device 22 is then moved downward on the second seat 222 along the direction perpendicular to that of the second track 200 to approach the workpiece 30 so that the second cutter element 228 can be used to machine the first end 300 of the workpiece 30. The second slide 224 of the second cutter device 22 is then moved upward on the second seat 222 along the direction perpendicular to that of the second track 200 to leave the workpiece 30, and the second cutter device 22 is then moved along the second track 200 to approach the second end 302 of the workpiece 30 so that the second cutter element 228 can be used to machine the second end 302 of the workpiece 30. In such a manner, the second cutter device 22 can be used to machine the two ends of the workpiece 30.

The first positioning device 26 and the second positioning device 27 may be used for retaining the workpiece 30 in place, thereby allowing the workpiece 30 to be stably machined by the first cutter device 21 and the second cutter device 22.

Figure 5:
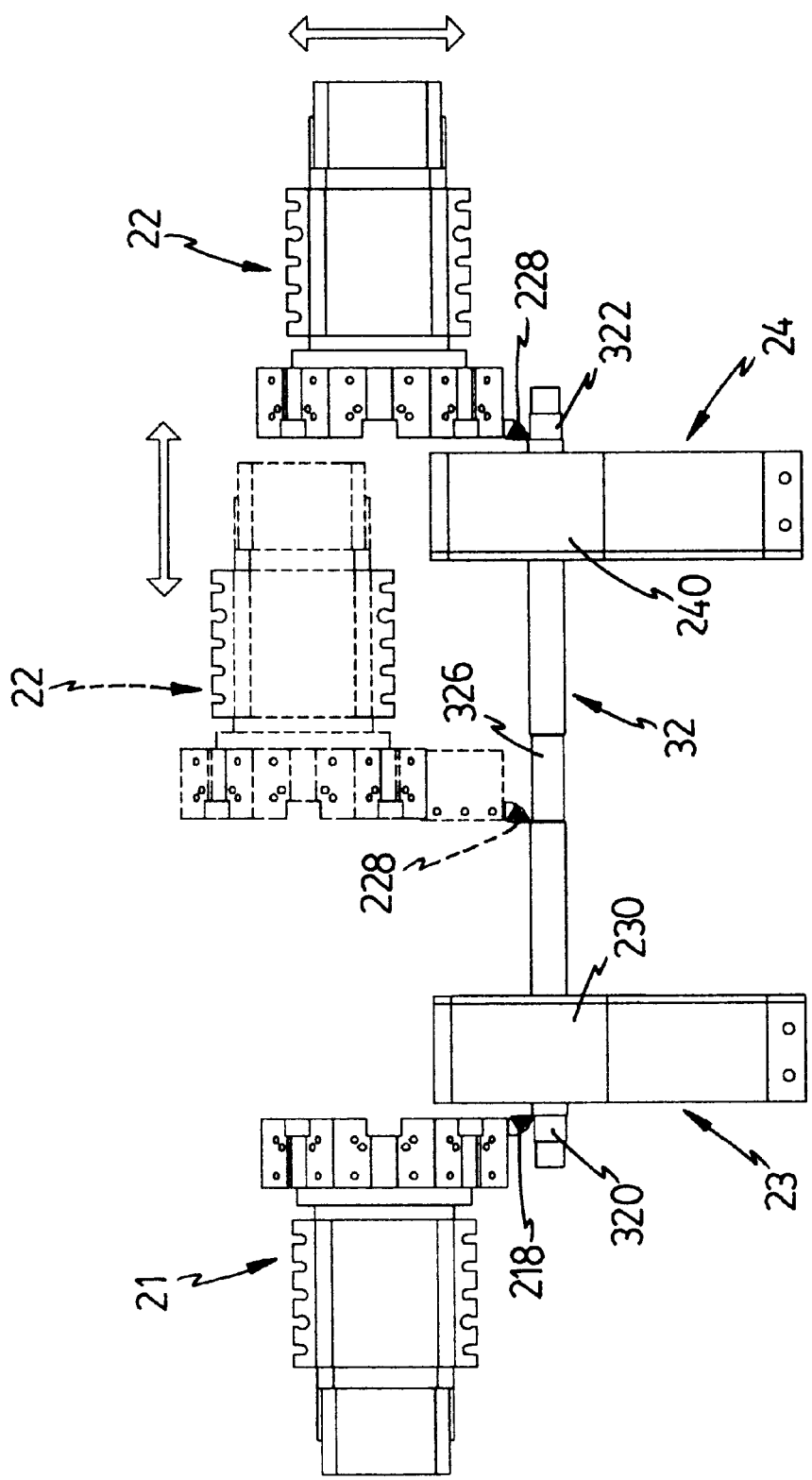
FIG. 5 is another operational view of the working machine as shown in FIG. 2.

Alternatively, referring to FIG. 5 with reference to FIGS. 1–3, an elongated workpiece 32 is clamped by the first chuck 230 of the first clamping device 23 and the second chuck 240 of the second clamping device 24, with its first end 320 protruding outward from the first clamping device 23 and with its second end 322 protruding outward from the second clamping device 24.

The first slide 214 of the first cutter device 21 is then moved downward on the first seat 212 along the direction perpendicular to that of the second track 200 to approach the first end 320 of the elongated workpiece 32 so that the first cutter element 218 can be used to machine the first end 320 of the elongated workpiece 32.

The second slide 224 of the second cutter device 22 is then moved downward on the second seat 222 along the direction perpendicular to that of the second track 200 to approach the second end 322 of the elongated workpiece 32 so that the second cutter element 228 can be used to machine the second end 322 of the elongated workpiece 32.

The second slide 224 of the second cutter device 22 is then moved upward on the second seat 222 along the direction perpendicular to that of the second track 200 to leave the second end 322 of the elongated workpiece 32, and the second cutter device 22 is then moved along the second track 200 to approach the mediate portion 326 of the elongated workpiece 32 so that the second cutter element 228 can be used to machine the mediate portion 326 of the elongated workpiece 32.

In such a manner, the first cutter device 21 in conjunction with the second cutter device 22 can be used to machine the two ends and the mediate portion of the elongated workpiece 32.

Accordingly, the working machine in accordance with the present invention can be used for simultaneously machining both ends and the mediate portion of a workpiece.

It is to be noted that the conventional working machine can only be used for fixing one end of the workpiece so that the one end of the workpiece is normally shielded and cannot be machined, and so that the conventional working machine cannot be used for machining both ends of the workpiece simultaneously.

The working machine according to the present invention can use a single cutter device in conjunction with a respective clamping device so as to machine both ends of a short workpiece simultaneously, without a need to detach the workpiece from the clamping device. In addition, the working machine according to the present invention can use a first cutter device mating with a respective first clamping device to work in conjunction with a second cutter device mating with a respective second clamping device so as to simultaneously machine both ends and the mediate portion of an elongated workpiece.

In comparison, in the Miyano prior art, it has to use a clamping device in conjunction with two sets of cutter devices so as to machine both ends of the workpiece. In the Nagel prior art, it has to use three sets of clamping devices in conjunction with two sets of cutter devices so that it is necessary to detach the workpiece from the clamping device to machine both ends of the workpiece.

Although the present invention has been described with a certain degree of particularity, it is to be understood that the present disclose has been made by way of example only and that many other possible modifications and variations can be made without departing from the scope of the present invention.

What is claimed is:

1. A working machine for machining a workpiece having two ends and a mediate portion, said working machine comprising:

a base (20) including a first track (201) and a second track (200) mounted therein, said first track (201) and said second track (200) arranged in parallel with each other;

at least one clamping device (23; 24) slidably mounted in said first track (201) for clamping said workpiece, said at least one clamping device including a powered rotatable chuck for clamping and rotating said mediate portion of said workpiece with two distal ends of said workpiece protruding outward from said chuck of said at least one clamping device; and at least two cutter devices (21; 22) each slidably mounted in said second track (200) to mate with said at least one clamping device (23; 24) for machining said workpiece;

wherein, each of said at least two cutter devices (21; 22) is movable relative to said at least one clamping device (23; 24) to move to two sides of said chuck of said at least one clamping device so as to simultaneously machine said two ends of said workpiece.

2. The working machine as claimed in claim 1, further comprising at least one positioning device (26; 27) slidably mounted in said first track (201), said at least one positioning device (26; 27) including a centering member (260; 270) detachably abutting one end of said workpiece (30; 32) for positioning said one end of said workpiece (30; 32).

3. The working machine as claimed in claim 1, wherein each of said at least two cutter devices (21; 22) includes a seat (212; 222) slidably mounted in said second track (200), a slide (214; 224) slidably mounted on said seat (212; 222) to move therewith and slidable along a direction perpendicular to that of said second track (200), and a cutter element (218; 228) secured to said slide (214; 224) to move therewith so that said cutter element (218; 228) is slidable along said second track (200), and is slidable along a direction perpendicular to that of said second track (200).

4. The working machine as claimed in claim 1, further comprising a motor (50) mounted on said base (20) for rotating said chuck (230; 240) of said at least one clamping device (23; 24).

5. The working machine as claimed in claim 1, further comprising a motor (52) mounted on said base (20) for moving said at least one clamping device (23; 24).

6. The working machine as claimed in claim 5, wherein said motor (52) is used for moving said at least one positioning device (26; 27).

7. The working machine as claimed in claim 1, further comprising at least one servo motor (28; 29) mounted on said base (20) and including a slidable threaded rod (280; 290) for moving said at least two cutter devices (21; 22).

8. The working machine as claimed in claim 1, wherein said working machine comprises a first clamping device (23) and a second clamping device (24).

9. The working machine as claimed in claim 1, wherein said working machine comprises a first cutter device (21) and a second cutter device (22).

10. The working machine as claimed in claim 1, wherein said working machine comprises a first positioning device (26) and a second positioning device (27).

* * * * *